United States Patent Office 3,456,028
Patented July 15, 1969

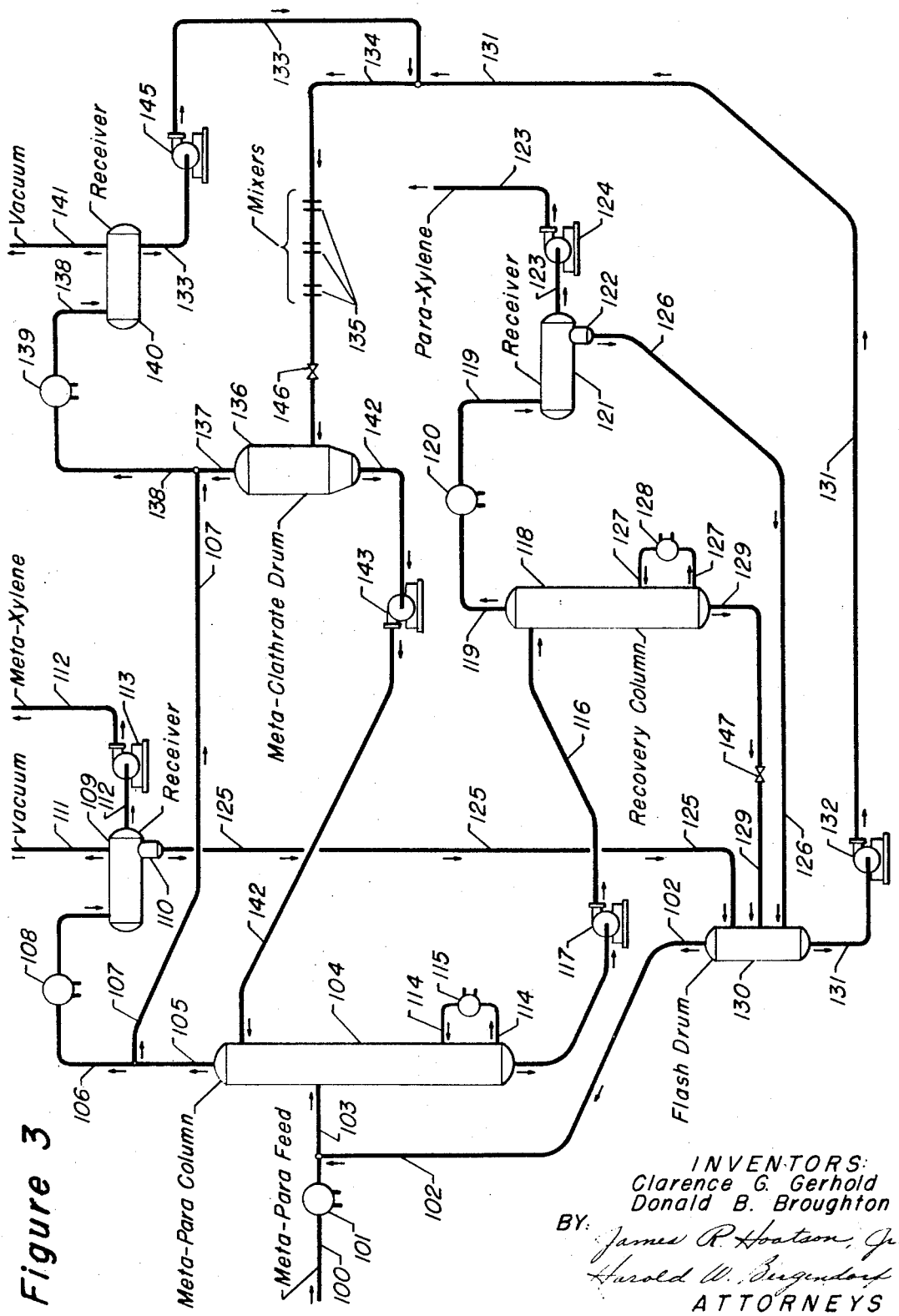

3,456,028
CLATHRATE SEPARATION PROCESS
Clarence G. Gerhold, Palatine, and Donald B. Broughton, Evanston, Ill., assignors to Universal Oil Products Company, Des Plaines, Ill., a corporation of Delaware
Filed Feb. 13, 1967, Ser. No. 615,700
Int. Cl. C07c 15/08, 7/02
U.S. Cl. 260—674                    15 Claims

ABSTRACT OF THE DISCLOSURE

Continuous process for separating a component from a fluid mixture wherein said component forms a more stable clathrate with a clathrating agent with respect to another component in the fluid mixture using a multistaging contacting column.

This invention relates to a continuous process to separate at least one component from a fluid mixture wherein the fluid mixture is contacted with an agent capable of forming a more stable clathrate with respect to at least one component of the fluid mixture than another component of said mixture in a multistage contacting apparatus. More specifically this invention relates to a continuous process for the separation and recovery of at least one component of a fluid hydrocarbon mixture wherein the mixture is contacted with an aqueous solution containing a clathrating agent having a selectivity for at least one component of the fluid mixture in a multistage apparatus, a suspension of clathrate is removed from the apparatus, decomposed and the component is recovered in substantially pure form. Still more specifically, this invention relates to a continuous process for the separation and recovery of substantially pure para xylene from a hydrocarbonaceous mixture comprising $C_8$ aromatic hydrocarbons wherein the mixture is contacted with an aqueous solution of α-dextrin in an absorption zone, the resulting clathrate is passed through a purification zone to produce substantially pure para xylene α-dextrin clathrate the purified clathrate is completely decomposed to free the para xylene from the clathrate and the para xylene is recovered in substantially pure form.

The prior art has recognized that separations can be made from organic fluid mixtures by the selective formation of a solid adduct or clathrate with at least one of the components of the fluid mixture with subsequent separation of the solid clathrate from the mixture. Clathrating is an effective technique to separate isomers by forming selective solid clathrate crystals with the clathration agent. The clathration agent may be in the form of a suspended solid slurry or dissolved in a solvent which will not dissolve the clathrate crystals. Clathration may be used to separate close boiling range isomers which cannot be practically separated by ordinary fractionation. For example, urea is known to form selective clathrates with relatively straight chain components of an organic mixture in comparison to components of relatively branched chain structure. Thiourea is a selective clathrating agent for relatively branched chain organic components in comparison to components of relatively straight chain structure. Another known class of clathrating agents are the Werner Complexes which tend to act as a clathrating agent for aromatic hydrocarbons. Werner Complexes are represented by the general formula Ni $(SCN)_2$ (primary substituted benzylamine)$_4$. A suitable clathrating agent is a metallic-nitro complex. This clathrating agent has a metal atom, an anion and a basic nitrogen compound. Component metals comprise nickel, cobalt, iron manganese or the like. Pyridine and quinoline or their derivatives are suitable basic nitrogen compounds. Suitable anions comprise thiocyanate, chloride, bromine, cyanide or nitride. Two specific examples of this class of clathrating agents are tetra-(4-acetylpyridino) nickel dithiocyanate and tetra-(4-methylpyridino) nickel dithiocyanate. This latter agent is useful to recover para xylene or para cymene. Separations may also be attained using the principal of hydrate formation in the process of the present invention. Still another class of clathrating agents are the Schardinger Dextrins such as α-dextrin, β-dextrin, γ-dextrin, etc. These materials in many cases are preferable clathrating agents for the process of this invention. Especially preferable for recovering para xylene from a fluid mixture of $C_8$ aromatic hydrocarbons is α-dextrin since it is readily soluble in water but forms a water insoluble clathrate with para xylene. α-dextrin is an oligosaccharide of the Schardinger dextrin family prepared by the action of Bacillus macerans on starch and composed of the following glucose

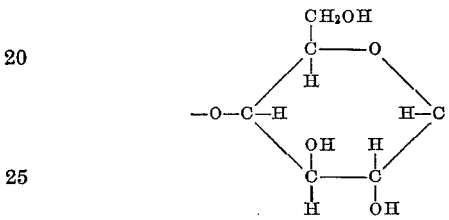

In its pure form, α-dextrin is a solid having six of the above glucose units arranged in a cyclic structure. Its skeletal structure without the H, OH and C groups shown is as follows:

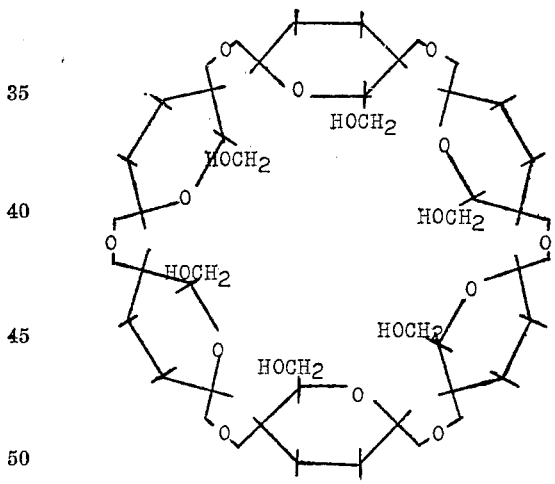

Similarly, β and γ-dextrins are composed of 7 and 8 ring glucose units respectively and are known to form clathrates. The Schardinger Dextrins and their method of preparation are described in detail in an article published in 1957 entitled, "Advances in Carbohydrate Chemistry," volume 12, Academic Press Inc. Publishers, pages 189–260 by Dexter French. The teachings contained therein are incorporated by reference herein.

It is an object of this invention to continuously separate at least one component from a fluid mixture of organic compounds.

It is another object of this invention to continuously separate a component from a fluid mixture of organic compounds with a clathrating agent selective for said component in a multistage contactor.

It is still another object of this invention to provide means for the continuous separation and recovery of a substantially pure component from a fluid mixture of organic compounds in which a clathrating agent is employed to separate said component from the mixture.

It is a further object of this invention to provide means for the efficient and economical recovery of at least one component from a fluid mixture of organic compounds in a continuous clathration separation process.

It is a still further object of this invention to continuously separate and recover more than one component from a fluid mixture of organic compounds and from each other.

It is a specific object of this invention to separate para xylene and ethyl benzene from a fluid mixture containing $C_8$ aromatic hydrocarbons and from each other.

It is another specific object of this invention to continuously separate and recover substantially pure para xylene from a fluid mixture containing meta xylene.

It is a more specific object of this invention to provide an efficient and economical continuous process to separate para xylene from meta xylene using an aqueous solution of $\alpha$-dextrin to selectively form a para xylene $\alpha$-dextrin clathrate.

These and other objects will become more apparent in the light of the following detailed description.

FIGURE 3 shows a specific flow scheme for the separation of para xylene from meta xylene.

In essence, the process of the present invention may be though of as a 3 functional zone separation process. The first zone is an absorption zone in which selective formation of clathrate of the component to be separated occurs. It frequently happens that clathrate formation will also occur with other components of the feed fluid mixture and thus in this first zone although essentially all of the component to be separated forms a clathrate, in addition there will be clathrate formation with other components. The second zone is a purification zone wherein the portions of the clathrate formed in the first zone is decomposed. More accurately, the clathrate of the less stable component is more readily decomposed and by countercurrently contacting this less stable clathrate with more stable component, the more stable component will displace the less stable component from the clathrate thus purifying the clathrate. This is what is meant by the term "partial decomposition" as used herein. Thus, since the clathrate of the component to be separated is more stable than the clathrates of the other components, partial decomposition is effective in producing a solid clathrate of the only component to be separated when properly multistaged using internal reflux. The third zone is a decomposition zone wherein clathrate of the component to be separated is entirely decomposed to recover the component. Thus, the feed is introduced into the absorption zone, the resulting solid clathrate formed therein is introduced into the purification zone and the remaining purified clathrate is introduced into the decomposition zone. The component to be separated is recovered from the decomposition zone and the non-selectively clathrated component of the feed is recovered from the absorption zone. Thus, when a binary feed mixture is employed such as para and meta xylene mixtures, both para and meta xylene can be recovered in substantially pure form.

Figure 1:
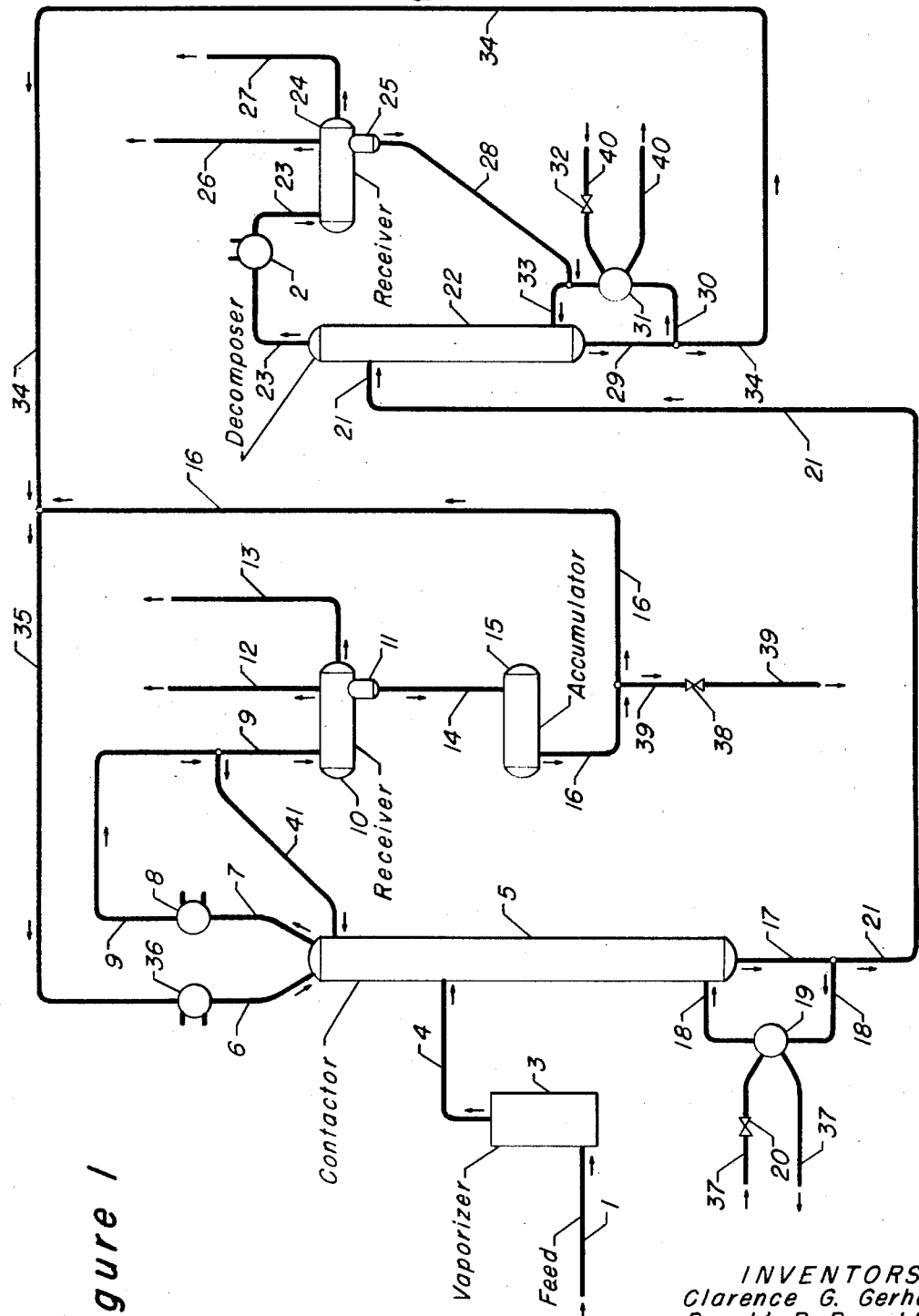
FIGURE 1 shows a simplified flow scheme for carrying out the general objects of this invention.

The process of the present invention is more fully explained by reference to FIGURE 1. The feed is introduced into conduit 1 where it passes through vaporizer 3 and conduit 4 finally entering contactor column 5. The feed is heated to the desired temperature in vaporizer 3 and may either be maintained in liquid, mixed or vapor phase. Preferably, the feed is entirely vaporized as explained hereinbelow. The clathrating agent enters the top of contactor 5 through conduit 6. This material is either in the form of a slurry of solid clathrating agent in carrying solution or preferably is dissolved in the carrying solution. For example, when using $\alpha$-dextrin as the clathrating agent, the $\alpha$-dextrin is dissolved in water and the aqueous solution of $\alpha$-dextrin is introduced into the top of column 5 through conduit 6. The upper portion of column 5, the vaporized feed rises upwardly and the aqueous $\alpha$-dextrin flows downwardly thereby countercurrently contacting each other. This upper portion is called the absorption zone referred to hereinbefore. As the feed rises through this zone, the selectively clathrating component of the feed forms clathrates in preference to the non-selective component. Thus, as the feed vapor passes upwardly through the absorption zone, it becomes progressively enriched in the non-selective component. By proper internal design in the absorption zone, many theoretical contacting stages may be contained therein and thus the vaporized material leaving column 5 through conduit 7 is entirely depleted in selective component. Preferably, the feed is present in the vaporized state since it is difficult to efficiently contact a liquid feed (an organic fluid mixture) with an immiscible aqueous $\alpha$-dextrin solution. In addition, if immiscible liquid phases are employed, solid clathrate which tends to form does so at the interface which may remain there and disrupt further transfer of selective component into the aqueous phase to form additional clathrate. The only way selective component can get to the aqueous phase is through the interface and the solids held there may tend to inhibit mass transfer across the interface. The solid clathrate held at the interface can be sticky and can cling to surface internals in column 5. The clathrate is generally not very soluble in the liquid hydrocarbon phase (if liquid hydrocarbon were present in column 5) but the clathrate tends to become dispersed as a solid in the liquid hydrocarbon phase as well as in the aqueous phase. Therefore, if the column operates with no vapor phase (just liquid hydrocarbon phase and liquid aqueous phase), the clathrate will tend to be conveyed upward (suspended in the liquid hydrocarbon phase) as well as downward. It is, of course, apparent that the upward conveyance of clathrate will be undesirable. If three phases are present in column 5 (vaporized hydrocarbon, liquid hydrocarbon and liquid aqueous phase), the liquid hydrocarbon phase will have about the same compositon as the organic portion of the vapor phase on each deck. Accordingly, the liquid hydrocarbon phase is parasitic in not contributing to separative efficiency and in addition increases heat requirement. Therefore, it is preferred to totally vaporize the feed and then countercurrently contact the vaporized feed with the liquid aqueous $\alpha$-dextrin solution. The vaporized feed material leaving the top of column 5 and substantially depleted in selective component flows through conduit 7, condenser 8, conduit 9 and finally into receiver 10. A portion of this condensed material is returned to column 5 through conduit 41 as reflux. In many cases, it is preferred to maintain column 5 under vacuum in which case a vacuum source is connected to column 5 and receiver 10 through conduit 12. The non-selective component of the feed is withdrawn from receiver 10 through conduit 13 where it is recovered. Water settles in boot 11 and is withdrawn through conduit 14.

The clathrate suspended in the aqueous solution which was formed in the upper part of column 5 flows downward into the lower portion of column 5 called the purification zone. A slurry of clathrate in the aqueous solution leaves the bottom of column 5 through conduit 17 where a portion thereof flows through conduit 18 and reboiler heater 19 and is returned to column 5. Heater 19 which is indirectly heated by heat exchange material flowing through conduit 37, and valve 20 will decompose the clathrate and vaporize the selective component. In addition, steam may also be injected into the bottom of column 5 to provide additional internal reflux. The rising selective component and steam (in the vapor state) contacts the decending solution of suspended clathrate in aqueous solution in the lower portion of column 5 called the purification zone hereinbefore referred to. Thus, in the purification zone, a decending suspension of clathrate (both selective and non-selective components) in an aqueous solution is countercurrently contacted with a vaporized stream of selective component and steam at a temperature somewhat higher than that employed in the absorption zone. This results in the partial decomposition of the clathrate, and since the non-selective component clathrate is more unstable, there will be a tendency for the clathrate to become enriched in selective component as it moves down through the purification zone. By proper multistaging, the solid clathrate leaving in the slurry in conduit 17 is essentially free of non-selective component. The rising selective component will tend to form a clathrate and thus displace the non-selective component therefrom.

The remaining portion of the aqueous solution clathrate slurry in conduit 17 flows through conduit 21 and enters decomposer column 22. This column represents the decomposition zone referred to hereinbefore. The decomposition zone is maintained at a higher temperature than the purification zone and completely decomposes the clathrate thus releasing the selective component. The vaporized selective component and steam are withdrawn from column 22 through conduit 23, condensed in condenser 2 and introduced into receiver 24. In many cases, it is preferable to maintain column 22 and receiver 24 under vacuum pressure in which case a vacuum source is connected to column 22 and receiver 24 through conduit 26. The condensed selective component is withdrawn through conduit 27 and recovered. Water is collected in boot 25 and withdrawn through conduit 28. A concentrated aqueous solution of α-dextrin is withdrawn through the bottom of column 22 where a portion thereof flows through conduit 30 and heater 31. The effluent from heater 31 is contacted with water in conduit 28 and the resulting steam aqueous solution is returned to column 22 to aid in further decomposition of clathrate. Heater 31 is indirectly heated by heat exchange material flowing through conduit 40 and valve 32.

The remaining portion of concentrated α-dextrin solution is withdrawn through conduit 34 where its concentration is adjusted by the addition of water thereto flowing in conduit 16 and the resulting aqueous α-dextrin solution flows through conduit 35 and cooler 36 wherein the temperature is adjusted to the desired level and finally introduced into the top of column 5 through conduit 6. The water flowing in conduit 16 is derived from accumulator 15 which is fed by conduit 14. Should the feed be wet or should extraneous water be added either to the feed or to column 5 as steam, the excess water is removed through conduit 39 and valve 38.

Figure 2:
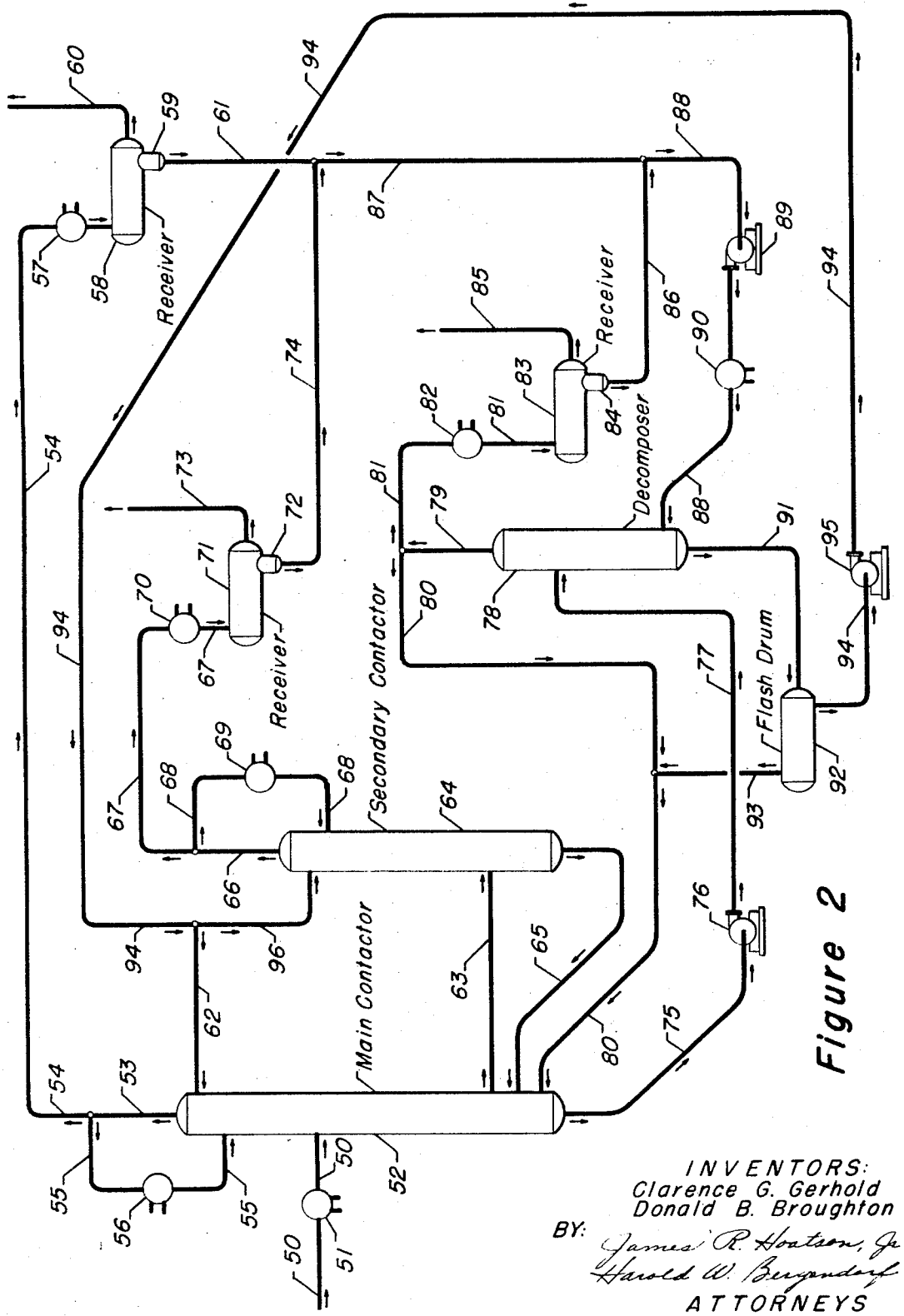
FIGURE 2 shows a flow scheme for the recovery of more than one substantially pure component using the clathrate separtion technique of the present invention.

FIGURE 2 shows an alternate embodiment for the recovery of at least two components from a fluid mixture wherein the clathrate separation technique of the present invention is employed. This embodiment is hereinafter described using a $C_8$ aromatic hydrocarbon mixture as the feed and an aqueous solution of α-dextrin as the clathrating agent. The feed mixture is introduced through conduit 50 and heater 51 into main contactor 52. Preferably, heater 51 is utilized to entirely vaporize the feed. An aqueous solution α-dextrin is introduced into the top of contactor 55 in the liquid phase through conduit 62 wherein it flows downward, countercurrently contacting the rising vaporized feed. All of the $C_8$ aromatic hydrocarbons tend to form clathrates with the α-dextrin but the selectivity of their formation (and their resulting stability) is in the order para xylene>ethylbenzene>meta xylene> ortho xylene. For example, at 73° C., the relative selectivities between the $C_8$ aromatics for the formation of clathrates with α-dextrin are meta xylene=1.0; para xylene=5.02; ortho xylene=0.7 and ethylbenzene=3.0. Thus, when using this feed, it is possible to separate para xylene from the other three $C_8$ aromatics, it is possible to separate para xylene and ethylbenzene from the other two $C_8$ aromatics or it is possible to separate the feed into a substantially pure para xylene product, a substantially pure ethylbenzene stream and a mixture of the remaining two $C_8$ aromatics. It is relatively easy to separate ortho xylene from the remaining $C_8$ aromatics by fractionation due to dissimilarity in boiling points. Ethylbenzene may be separated by $C_8$ aromatics by extensive super fractionation but the method of the embodiment of FIGURE 2 allows its recovery in substantially pure form using the clathration technique.

A vapor stream of hydrocarbons is withdrawn from the top of contactor 52 and comprises steam meta xylene and ortho xylene where a portion thereof flows into conduit 55, condenser 56 and is returned to contactor 52 as reflux. The remaining portion of the vaporized stream flows through conduit 54, condenser 57 and into receiver 58. The material is separated in receiver 58 into a hydrocarbon phase and an aqueous phase, the latter phase settling in boot 59. The hydrocarbon phase comprising meta xylene and ortho xylene is withdrawn from receiver 58 through conduit 60 where, if desired, it may be separated into a substantially pure meta xylene stream and a substantially pure ortho xylene stream by ordinary fractionation. The aqueous phase is withdrawn from boot 59 through conduit 61.

A vapor side cut is withdrawn through conduit 63 at a point below conduit 50 and introduced into secondary contactor 64. An aqueous solution of α-dextrin is introduced into the top of contactor 64 through conduit 96 wherein the descending liquid solution contacts the ascending vapor in multistage contact. A vaporized overhead stream comprising ethylbenzene and steam is withdrawn from the top of contactor 64 through conduit 66 whereupon a portion thereof flows through conduit 68 and condenser 69 finally being returned to contactor 64 as reflux. The remaining portion of overhead stream flows through conduit 67, condenser 70 and into receiver 71. The condensed material is separated into a hydrocarbon phase and an aqueous phase, the latter phase settling in boot 72. The ethylbenzene is withdrawn through conduit 73 and recovered. The aqueous phase is withdrawn from boot 72 through conduit 74. A slurry of clathrate and aqueous solution is withdrawn from contactor 64 through conduit 65 and is returned to contactor 52.

A slurry of para xylene α-dextrin clathrate is withdrawn from the bottom of contactor 52 through conduit 75 where it flows through pump 76, conduit 77 and into decomposer 78. A vaporized overheat stream comprising steam and para xylene is withdrawn from decomposer 78 through conduit 79 where a portion thereof flows through conduit 80, is mixed with steam from conduit 93 and is returned to the bottom of contactor 52 thereby providing internal reflux as well as providing heat for contactor 52. The remaining portion of vaporized stream flows through conduit 81, condenser 82 and into receiver 83. The para xylene hydrocarbon phase is separated from the aqueous phase in receiver 83, the latter phase settling in boot 84. The para xylene is withdrawn from receiver 83 through conduit 85 and is recovered. The aqueous phase is withdrawn from boot 84 through conduit 86. The aqueous phase flowing in conduit 61 is mixed with the aqueous phase flowing in conduit 74 and the resulting mixture flows through conduit 87 eventually mixing with the aqueous phase in conduit 86. This final mixture of aqueous phases flows through conduit 88, pump 89 and heater 90 whereupon it is returned to the bottom of decomposer 78 to provide sufficient heat and steam to effectively decompose the clathrate. An aqueous solution of α-dextrin is removed from decomposer 78 through conduit 91 and flows into flash drum 92. Since decomposer 78 is maintained at a higher pressure than contactors 52 and 64 (in order to utilize higher temperatures which serve to decompose the clathrate), the sensible heat put into decomposer 78 can be partially recovered and utilized to reboil contactor 52 by following this processing sequence. Flashed steam from drum 92 flows through conduit 93 eventually flowing into contactor 52. An aqueous solution of α-dextrin flows from drum 92 through conduit 94, pump 95 and a portion thereof flows through conduit 62 and into the top of contactor 52. The remaining aqueous solution of α-dextrin flows through conduit 96 and into the top of contactor 64.

Suitable operating conditions for carrying out the process shown in FIGURE 2 are summarized in the following Table 1.

TABLE 1

|  | Top temp., ° F. | Bottom temp., ° F. | Pressure, p.s.i.a. |
| --- | --- | --- | --- |
| Contactor 52 | 150–195 | 170–215 | 6–15 |
| Contactor 64 | 155–200 | 160–205 | 6–15 |
| Decomposer 78 | 205–240 | 220–255 | 15–22 |

In the FIGURE 2 embodiment, there are five essential zones, a first absorption zone, a first purification zone, a second absorption zone, a second purification zone and a decomposition zone. Thus, the region in contactor 52 above conduit 50 to the top is the first absorption zone, the region between conduits 50 and 63 is the first purification zone, the region between conduit 65 and the bottom of contactor 52 is the second purification zone, contactor 64 is the second absorption zone and decomposer 78 is the decomposition zone. The conditions of temperature, α-dextrin concentration and amount of α-dextrin solution are maintained at the top of contractor 52 to only permit meta xylene and ortho xylene vapor thereout. The conditions of temperature, α-dextrin concentration and amount of α-dextrin at the top of contactor 64 are maintained to prevent the passage of para xylene vapor thereout. The conditions of temperature at the bottom of contactor 52 is maintained to render all clathrates except para xylene α-dextrin unstable. By operating in this manner, both ethylbenzene and para xylene are readily obtained as separate streams in a relatively pure state. The amount of α-dextrin solution introduced into the top of column 64 is relatively less than that introduced into the top of column 52 (on a mole of α-dextrin per mole of hydrocarbon basis).

Suitable concentrations of α-dextrin in the initial aqueous solution are from about 5% by weight up to about 54% by weight although preferable concentrations are from about 30 to about 50 weight percent. Especially preferable are concentrations of from about 43 to about 49 weight percent. The temperature employed in the absorption and purification steps are from about 122° F. to about 203° F. and the temperature employed in the decomposition step is maintained at from about 158° F. to about 230° F. A temperature gradient is maintained in the contactors with the lowest temperature in the top and highest temperature in the bottom. Suitable pressures maintained during these steps are from about 0.1 atmosphere (absolute) to about 100 atmospheres although preferably the pressure is maintained especially at from about 0.3 atmosphere (absolute) to about 4 atmospheres.

It should be recognized that the purification zones represent areas in which partial decomposition of the clathrate occurs and since the more selective clathrates are also more stable, there will be a tendency to selectively decompose those components of the feed that form the less stable clathrates. Since this process is a continuous multistage contactor, there will be a gradual enrichment in concentration of the selective components originally present in the feed.

It should be noted that the contactors serve the function of countercurrently contacting a liquid phase with a vapor phase. When this contact is attained, a solid clathrate phase forms. Therefore, the contactor apparatus must be suitable for the simultaneous handling of solid, liquid and vapor phases. Internal contacting means such as decks, packing or the like must be carefully designed so that the solid phase which forms is carried downward with the liquid phase and not hung up on internal contacting means. When using an aqueous solution of α-dextrin as the clathrating agent, it is especially preferable to maintain concentrations of α-dextrin in the initial solution of about 45 to 47 weight percent in order to minimize the size of the recycle water stream.

The following example is presented to illustrate a preferable embodiment to separate para xylene and meta xylene from a meta-para xylene feed mixture. This example is illustrative with reference to FIGURE 3. The expected heat and weight balance results of the various streams are tabulated in Table 2. The meta-para xylene feed mixture which flows through conduit 100, and heater 101, at a rate of about 3000 barrels per day is mixed with steam from conduit 102 and the resulting mixture flows through conduit 103 and into meta-para column 104 at a temperature of 180° F. and a pressure of 458 mm. of mercury absolute. The heat duty on heater 101 is about 9,800,000 B.t.u./hr. Meta xylene vapor and steam leave the top of column 104, which is maintained at a temperature of 170° F. and a pressure of 390 mm. of mercury absolute. This material flows through conduit 105 where a portion thereof flows through conduit 106, condenser 108 and into receiver 109 while the other portion flows into conduit 107. The cooling duty on condenser 108 is about 21,600,000 B.t.u./hr. Receiver 109 is maintained at a temperature of 150° F. and a pressure of about 390 mm. of mercury absolute. Conduit 111 connects receiver 109 to a vacuum source. Substantially pure meta xylene is withdrawn through conduit 112 and pump 113 at a rate of about 2075 barrels per day. The condensed water which settles in boot 110 in receiver 109 is withdrawn through conduit 125 at a rate of about 1215 barrels per day. The other portion of the overheat material from column 104 is mixed with steam from meta clathrate drum 136 flowing in conduit 137 and the resulting mixture flows through conduit 138, condenser 139 and into receiver 140. The cooling duty on condenser 139 is about 61,100,000 B.t.u./hr. Receiver 140 which is maintained at a temperature of 150° F. and a pressure of about 390 mm. of mercury absolute is connected to a vacuum source in conduit 141. The material in receiver 140 is withdrawn therefrom at a rate of about 9180 barrels per day through pump 145 where it mixes with 65,000 barrels per day of an aqueous α-dextrin solution flowing in conduit 131. The resulting mixture flows through conduit 134, mixers 135 to promote contact between the aqueous phase and the hydrocarbon phase, through valve 46 and into meta clathrating drum 136. The meta clathrating drum which has dimensions of about 10 feet in diameter and 60 feet in length is maintained at a temperature of about 170° F. and a pressure of about 390 mm. of mercury absolute. A portion of the liquid water flashes when passing through valve 146 and the resulting water vapor is withdrawn through conduit 137. A slurry of meta xylene α-dextrin clathrate and aqueous α-dextrin solution is withdrawn from drum 136 through conduit 142 wherein it flows through pump 143 and is returned to the top of column 104 as reflux.

A slurry of para xylene α-dextrin clathrate and aqueous α-dextrin solution is withdrawn from the bottom of column 104 through conduit 114 and reboiler heater 115 and returns to column 104 to generate internal reflux and provide heat energy to operate column 104. The heat duty on reboiler 115 is about 47,000,000 B.t.u./hr. The bottom of column 104 is maintained at a pressure of about 512 mm. of mercury absolute and a temperature of about 191° F. A slurry of para xylene α-dextrin clathrate and aqueous α-dextrin solution is withdrawn from the bottom of column 104 through conduit 116, pump 117 and into recovery column 118. Vaporized para xylene and steam are withdrawn from the top of column 118 through conduit 119 and pass through condenser 120 and into receiver 121. The top of column 118 is maintained at a pressure of about 1006 mm. of mercury absolute and a temperature of about 221° F. The cooling duty on condenser 120 is about 21,800,000 B.t.u./hr. which is sufficient to maintain receiver 121 at a temperature of about 200° F. The condensed para xylene hydrocarbon phase is withdrawn from receiver 121 through conduit 123 and pump 124 at a rate of about 925 barrels per day. The condensed aqueous phase which settles in boot 122 is withdrawn through conduit 126 at a rate of 1390 barrels per day. The bottom of column 118 is maintained at a temperature of about 227° F. which is sufficient to entirely decompose all of the para xylene $\alpha$-dextrin clathrate. An aqueous solution of $\alpha$-dextrin is withdrawn from the bottom of column 118 through conduit 127 and passes through reboiler heater 128 before returning to column 118. The heating duty on reboiler 128 is about 51,500,000 B.t.u./hr. An aqueous solution of $\alpha$-dextrin is withdrawn from the bottom of column 118 at a rate of about 64,000 barrels per day through conduit 129 and valve 147 and flows into flash drum 130. The aqueous phases flowing in conduits 125 and 126 are also introduced into flash drum 130. Drum 130 is maintained at a pressure of about 550 mm. of mercury absolute and a temperature of about 196° F. Since some of the water is superheated with respect to the conditions maintained in drum 130, flashing will occur with resulting evolution of steam. This steam is withdrawn from the top of drum 130 through conduit 102 where it mixes with incoming feed as described hereinbefore. The following Table 2 shows the pertinent information of the various streams in the embodiment of FIGURE 3. It is expected that column 104 will be about 12 feet in diameter and contain about 40 contacting decks and column 118 will be about 8 feet in diameter and contains about 15 decks.

3. The process of claim 2 further characterized in that the clathrating agent withdrawn from the decomposition zone is recycled to said other end of the absorption zone.

4. The process of claim 3 further characterized in that the stream comprising vaporized first component is produced by diverting a portion of the slurry of clathrate and clathrating agent to a heater, heating the slurry sufficiently to release vaporized first component and returning the resulting heated mixture to the other end of the purification zone.

5. The process of claim 3 further characterized in that the stream comprising vaporized first component is produced by recycling a portion of the first component withdrawn from the decomposition zone to the other end of the purification zone.

6. The process of claim 3 further characterized in that the clathrating agent comprises an aqueous solution of $\alpha$-dextrin.

7. The process of claim 6 further characterized in that the fluid mixture comprises a mixture of $C_8$ aromatic hydrocarbons, the first component of the fluid mixture comprises para xylene and the second component of said fluid mixture comprises meta xylene.

8. The process of claim 7 further characterized in that the concentration of $\alpha$-dextrin in the aqueous solution introduced into the other end of the absorption zone is from about 30% to about 50% by weight, the temperature in the absorption zone and the purification zone is from about 122° F. to about 203° F., the temperature in the decomposition zone is from about 158° F. to about 230°

TABLE 2

| Conduit | 100 | 102 | 105 | 106 | 107 | 137 | 138 | 133 | 142 | 131 | 134 | 116 | 119 | 129 | 125 | 126 |
|---|---|---|---|---|---|---|---|---|---|---|---|---|---|---|---|---|
| Material therein: | | | | | | | | | | | | | | | | |
| Water, moles/hr | | 1,285 | 2,385 | 985 | 1,400 | 1,410 | 2,810 | | 34,100 | 32,700 | | 33,000 | 1,130 | 31,800 | | |
| Xylene, moles/hr | 362 | | 590 | 248 | 342 | 346 | 688 | | | | | | 113 | | | |
| Dextrin, moles/hr | | | | | | | | | 215 | | 558 | | 445 | | 558 | |
| Clathrate, moles/hr | | | | | | | | | 343 | | | | 113 | | | |
| Temperature, °F | 70 | 196 | 170 | 170 | 170 | 170 | 170 | 150 | 170 | 196 | | 191 | 221 | 227 | 150 | |
| Absolute pressure, mm. mercury | | 550 | 390 | 390 | 390 | 390 | 390 | | | | | 512 | 1,006 | 1,006 | | |
| Density, lb./ft.³ | 54.5 | 0.0272 | 0.0397 | 0.0397 | 0.0397 | 0.0397 | 0.0397 | | 74.8 | 74.8 | | 74.8 | 0.0695 | 74.8 | | |
| Gallons | 87.5 | | | | | | | | | | | | | | | |
| Barrels per day | 3,000 | | | | | | | | 9,180 | 68,400 | 65,000 | 74,180 | 66,000 | | 64,000 | 1,215 | 1,390 |
| Flowing, ft.³/sec | | 236 | 738 | 308 | 430 | 435 | 865 | | | | | | | 130 | | |

We claim as our invention:

1. A process for the separation of a fluid mixture containing a first component that forms a more stable clathrate with a clathrating agent than a second component of said mixture which comprises:
   introducing said fluid mixture into one end of an absorption zone;
   introducing the clathrating agent into the other end of the absorption zone and countercurrently contacting the clathrating agent with the fluid mixture;
   withdrawing and recovering the unclathrated portion of said fluid mixture comprising second component from the other end of the absorption zone;
   withdrawing the resulting clathrate and remaining clathrating agent from said one end of the absorption zone and introducing this material into one end of a purification zone;
   introducing a stream comprising vaporized first component into the other end of the purification zone;
   countercurrently contacting said material with said vaporized first component in the purification zone;
   withdrawing clathrate and clathrating agent from said other end of the purification zone as a slurry and introducing the slurry into a decomposition zone;
   decomposing the clathrate in the decomposition zone;
   withdrawing the clathrating agent from the decomposition zone; and
   withdrawing and recovering the first component of the fluid mixture from the decomposition zone.

2. The process of claim 1 further characterized in that the fluid mixture is introduced into the absorption zone in the vapor phase.

F. and is higher than the temperature in the absorption and purification zones, and the pressure in these zones is from about 0.3 to about 4.0 atmospheres absolute with the pressure being higher in the decomposition zone than the absorption and purification zones.

9. The process of claim 8 further characterized in that the absorption zone and the purification zone are contained with a single contacting vessel, the fluid mixture being introduced at a point intermediate to the end of the vessel, the region within the vessel above said intermediate point and below the top of the vessel comprising the absorption zone and the region within the vessel below said intermediate point and above the bottom of the vessel comprising the purification zone.

10. A process for the separation and recovery of para xylene and ethylbenzene from a fluid mixture of $C_8$ aromatic hydrocarbons including meta xylene which comprises:
   introducing said fluid mixture in the vapor phase into bottom of a first absorption zone;
   introducing a liquid aqueous solution of $\alpha$-dextrin into the top of the first absorption zone and countercurrently contacting the descending liquid solution with the ascending vaporized hydrocarbons to form solid clathrates with both para xylene and ethylbenzene therein;
   withdrawing and recovering a vapor stream from the top of the first absorption zone comprising meta xylene;
   introducing descending liquid and solid clathrate into the top of a first purification zone and partially decomposing the solid clathrate therein;

withdrawing a vapor side cut from the bottom of the first purification zone and introducing said vapor side cut into the bottom of a second absorption zone;

introducing a liquid aqueous solution of α-dextrin into the top of the second absorption zone and countercurrently contacting the descending aqueous solution with the ascending vapor side cut to form solid clathrate with para xylene therein;

withdrawing and recovering a second vapor stream from the top of the second absorption zone comprising ethylbenzene;

introducing descending liquid and solid clathrate from the second absorption zone into the top of a second purification zone and partially decomposing the solid clathrate therein;

withdrawing a slurry of solid clathrate and aqueous α-dextrin solution from the bottom of the second purification zone and introducing said slurry into a decomposition zone;

decomposing the solid clathrate within the decomposition zone;

withdrawing and recovering a third vapor stream from the top of decomposition zone comprising para xylene; and withdrawing an aqueous solution of α-dextrin from the bottom of the decomposition zone.

11. The process of claim 10 further characterized in that the aqueous solution of α-dextrin withdrawn from the bottom of the decomposition zone is recycled to the top of the first and second absorption zones and its concentration is from about 30% to about 50% by weight of α-dextrin.

12. A process for the separation of para xylene from meta xylene which comprises:

(a) vaporizing a feed containing a mixture of para xylene and meta xylene;

(b) introducing the vaporized mixture into the bottom of an absorption zone;

(c) introducing a slurry comprising aqueous α-dextrin solution and meta xylene α-dextrin clathrate into the top of the absorption zone and countercurrently contacting the descending slurry with the ascending vapor mixture to form solid para xylene α-dextrin clathrate therein;

(d) withdrawing a vapor stream comprising meta xylene from the top of the absorption zone and recovering a portion thereof;

(e) condensing the remaining portion of vapor stream and contacting the condensed portion with a first aqueous solution of α-dextrin to form said slurry comprising aqueous α-dextrin solution and meta xylene α-dextrin clathrate;

(f) recycling the slurry as set forth in step (c) hereinabove and into the top of the absorption zone;

(g) introducing a descending mixture leaving the bottom of the adsorption zone and comprising aqueous solution, solid para xylene α-dextrin clathrate and solid meta xylene α-dextrin clathrate into the top of a purification zone;

(h) introducing a stream comprising para xylene vapor and steam into the bottom of the purification zone;

(i) countercurrently contacting the ascending para xylene vapor and steam with the descending material on top of the purification zone to effect partial decomposition of clathrate and replace the meta xylene with para xylene in the clathrate;

(j) withdrawing a second slurry of aqueous solution and para xylene α-dextrin clathrate from the bottom of the purification zone and introducing this second slurry into a decomposition zone;

(k) decomposing the para xylene α-dextrin clathrate in the decomposition zone and separating a vaporized stream comprising para xylene from a second aqueous α-dextrin solution therein;

(l) condensing and recovering the para xylene from the vaporized stream; and (m) withdrawing the aqueous α-dextrin solution from the decomposition zone.

13. The process of claim 12 further characterized in that the second α-dextrin solution of step (m) is flashed to evolve steam, the flashed aqueous α-dextrin solution is returned to step (e) as said first aqueous solution of α-dextrin and the evolved steam is returned to the purification zone.

14. The process of claim 12 further characterized in that the stream of step (h) is prepared by heating a portion of the second slurry withdrawn from the bottom of the purification zone to decompose the solid clathrate and evolve para xylene vapor and steam and this heated material is returned to the bottom of the purification zone.

15. The process of claim 12 further characterized in that the stream of step (h) is obtained by recycling a portion of the vaporized stream set forth in step (k).

References Cited
UNITED STATES PATENTS

| | | | |
|---|---|---|---|
| 2,793,240 | 5/1957 | Schaeffer et al. | 260—674 |
| 2,835,714 | 5/1958 | Nixon et al. | 260—674 |
| 3,277,201 | 10/1966 | Schaeffer | 260—674 |

DELBERT E. GANTZ, Primary Examiner

C. R. DAVIS, Assistant Examiner

U.S. Cl. X.R.

106—208; 127—30